United States Patent
Bedingfield, Sr.

(10) Patent No.: US 8,701,005 B2
(45) Date of Patent: *Apr. 15, 2014

(54) METHODS, SYSTEMS, AND COMPUTER PROGRAM PRODUCTS FOR MANAGING VIDEO INFORMATION

(75) Inventor: James Carlton Bedingfield, Sr., Lilburn, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1264 days.

This patent is subject to a terminal disclaimer.

(21) Appl. No.: 11/411,330

(22) Filed: Apr. 26, 2006

(65) Prior Publication Data

US 2007/0256016 A1    Nov. 1, 2007

(51) Int. Cl.
*G06F 17/30* (2006.01)

(52) U.S. Cl.
CPC ............... *G06F 17/30038* (2013.01)
USPC ............... 715/721; 715/719; 715/720

(58) Field of Classification Search
CPC .......... G06F 17/30038; G11B 27/34
USPC .......................... 715/719, 721, 720
See application file for complete search history.

(56) References Cited

U.S. PATENT DOCUMENTS

| | | | |
|---|---|---|---|
| 5,717,869 A * | 2/1998 | Moran et al. | 715/716 |
| 6,366,296 B1 * | 4/2002 | Boreczky et al. | 715/719 |
| 6,624,846 B1 * | 9/2003 | Lassiter | 348/211.4 |
| 6,668,377 B1 * | 12/2003 | Dunn | 725/92 |
| 6,902,613 B2 * | 6/2005 | Babler | 106/493 |
| 7,356,830 B1 * | 4/2008 | Dimitrova | 725/51 |
| 7,446,803 B2 * | 11/2008 | Leow et al. | 348/231.5 |
| 2007/0256007 A1 * | 11/2007 | Bedingfield, Sr. | 715/512 |
| 2007/0256008 A1 * | 11/2007 | Bedingfield, Sr. | 715/512 |
| 2007/0256030 A1 * | 11/2007 | Bedingfield, Sr. | 715/853 |

OTHER PUBLICATIONS

U.S. Appl. No. 11/031,777, filed Jan. 7, 2005, entitled "Graphical Chronological Path Presentation."

* cited by examiner

*Primary Examiner* — Sara England
(74) *Attorney, Agent, or Firm* — Guntin & Gust, PLC; Andrew Gust (57) ABSTRACT

Recorded video information is managed by annotation markers. The recorded video information is annotated with at least one marker and the annotated video information is saved in an electronically searchable file.

19 Claims, 7 Drawing Sheets

METHODS, SYSTEMS, AND COMPUTER PROGRAM PRODUCTS FOR MANAGING VIDEO INFORMATION

FIELD OF THE INVENTION

The present invention relates generally to information processing and, more particularly, to systems, methods, and computer program products for processing video information.

BACKGROUND OF THE INVENTION

As days and years go by, people generate exponentially-increasing volumes of personal information. Such information can include documents, e-mail messages, photos, videos, music collections, Web page content, medical records, employment records, educational data, etc. This profusion of information can be organized to some degree and presented; however, it may be of limited use due to a lack of efficient data management systems and methods.

Personal data may be acquired from numerous sources through a variety of means. Moreover, the personal data may be stored in various places using various storage means, such as, for example, on a personal computer, on a cell phone, in computer systems or in paper files at a doctor's, lawyers, and/or accountant's office, etc. The personal data may pertain to a single person or may also pertain to one or more people.

Some organizations offer storage services for information, such as, for example, photos and music. Other organizations provide backup services for all electronic information and/or paper files that a person or organization may have. Nevertheless, there remains a need for improvements in collecting and managing personal information.

SUMMARY OF THE INVENTION

According to some embodiments of the present invention, recorded video information is managed by annotation markers. The recorded video information is annotated with at least one marker and the annotated video information is saved in an electronically searchable file.

In other embodiments, annotating the video information with at least one marker comprises annotating the video information with the at least one marker while recording the video information.

In still other embodiments, annotating the video information with at least one marker comprises playing the recorded video information for a user and inserting at least one audio and/or video marker into the recorded audio information in response to user input.

In still other embodiments, annotating the video information and saving the annotated video information comprises processing the video information to detect logical divisions therein, electronically generating at least one audio and/or video marker to identify the logical divisions in the video information, and saving the video information and at least one audio and/or video marker in the electronically searchable file.

In still other embodiments, annotating the video information and saving the annotated video information comprises displaying the video information via a user interface, adding at least one audio and/or video marker to the video information via the user interface, and saving the video information with the at least one audio and/or video marker in the electronically searchable file.

In still other embodiments, the at least one marker comprises an image, a sound, and/or text.

In still other embodiments, the at least one marker comprises a date and/or time stamp.

In still other embodiments, recording the video information comprises buffering the video information and saving the buffered video information responsive to user input.

In still other embodiments, recording the video information comprises recording the video information intermittently responsive to user input.

In still other embodiments, access to the annotated video information is presented in a visual medium that comprises a path with a plurality of partitions.

In still other embodiments, saving the annotated video information in the electronically searchable file comprises saving the at least one marker in the electronically searchable file. The electronically searchable file is separate from a file containing the recorded video information, but is associated therewith.

In still other embodiments, the at least one marker is substantially undetectable by manual review.

In still other embodiments, the at least one marker is substantially detectable by manual review.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

As used herein, the term "file" may include any construct that binds a conglomeration of information, such as instructions, numbers, words, images, audio, and/or video into a coherent unit. Accordingly, a file may be, for example, a document, an image, an email, a database document, an application, an audio recording, a video recording, and/or a Web page.

Embodiments of the present invention are described herein with respect to managing audio and/or video information. For example, an individual may wish to maintain an audio and/or video record of various events in his or her life. According to some embodiments of the present invention, such audio and/or video information may be recorded and then annotated to categorize portions of the audio and/or record and to facilitate subsequent searching of the audio and/or video record. Moreover, U.S. patent application Ser. No. 11/031,777, entitled "Graphical Chronological Path Presentation," describes embodiments in which a chronological record of events and information in the life of a person or entity may be displayed or presented by way of a highway representation. U.S. patent application Ser. No. 11/031,777 (hereinafter '777 application) is hereby incorporated herein by reference in its entirety. In some embodiments, the highway is represented as a path with a plurality of partitions. The annotated audio and/or video information described herein may, for example, be incorporated into one or more of the partitions comprising the path of the '777 application.

Figure 1:
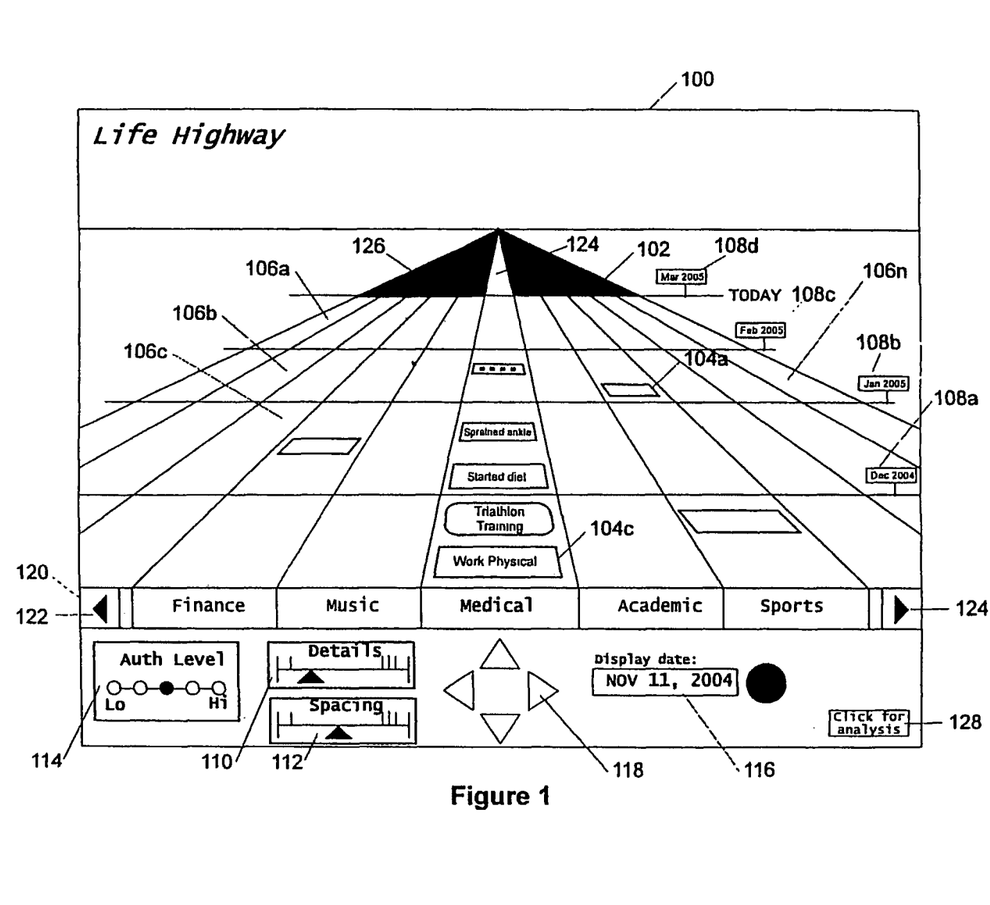
FIG. 1 is a diagram that illustrates a life history in the graphical chronological path presentation of a highway in accordance with some embodiments of the present invention.

FIG. 1 illustrates a display 100, in accordance with some embodiments of the present invention, which includes a graphical interface of a highway 102 where, for example, nearer entries 104c are earlier in time and farther entries 104a are later in time. In other embodiments, this can be reversed or factors other than time can be used, such as importance and/or priority. Multiple lanes can be used to categorize events (a single lane could be used if desired). Lanes may optionally show, for example, a person's age and/or the calendar year as mile markers 108a-d extending across the lanes, with optional displays by month, week, etc.

In some embodiments, the user reviews the events by "flying over" or "driving down" the highway 102. Control can be provided using directional arrows 118 or, in other embodiments, keyboard arrows, keyboard mnemonics, a mouse, a joystick, a trackball, and/or a touchscreen. A user can also enter text data for searches or for navigation to a specific year or age. The user can pick a lane 106a-106n on the highway to drive in. The lane 124, 126 that the viewer ("driver") is in may be signified by a representation of headlights and the driver may see details of the events in that lane; but the driver may also see events in other lanes and can move into other lanes at will. Certain lanes and/or events may be concealed from a given viewer or class of viewers. A class of viewers may correspond to an authorization level.

The category bar 120 holds the label for the category of the events in a lane. If there are more lanes than the settings afford to fit on the screen, the user/viewer can scroll to either side, if available, with arrows 122, 124. The user can set the level of detail for each event with the sliding bar 110. The user can set a maximum detail for an event for an authentication level settable in authentication window 114. A viewer can see the authentication level in the authentication window 114, but cannot change it. A viewer may change the detail level up to the maximum level set by the user and may set the spacing to any desired level in the spacing window 112. The settings in each window 110, 112, and 114 may be performed with sliding bars, radio buttons, or other generally known methods. A button 128 may be provided to invoke an analysis of events on the highway 102.

The display date window displays the current date when entering the highway. However, the date in the display date window 116 may change to the date of the event that a user/viewer hovers over or selects, configurable by the user/viewer.

Other embodiments may include a feature for developing an indication that some event has been viewed. A trail is kept of the events that are viewed. The indication gets stronger as the event is viewed more often. As time passes, if the event is not viewed, the strength of the indication dissipates. The indication may be used to cache certain events with strong indications for quicker access.

Embodiments of the highway 102 is described in more detail in the '777 application, which has been incorporated by reference as discussed above.

Figure 2:
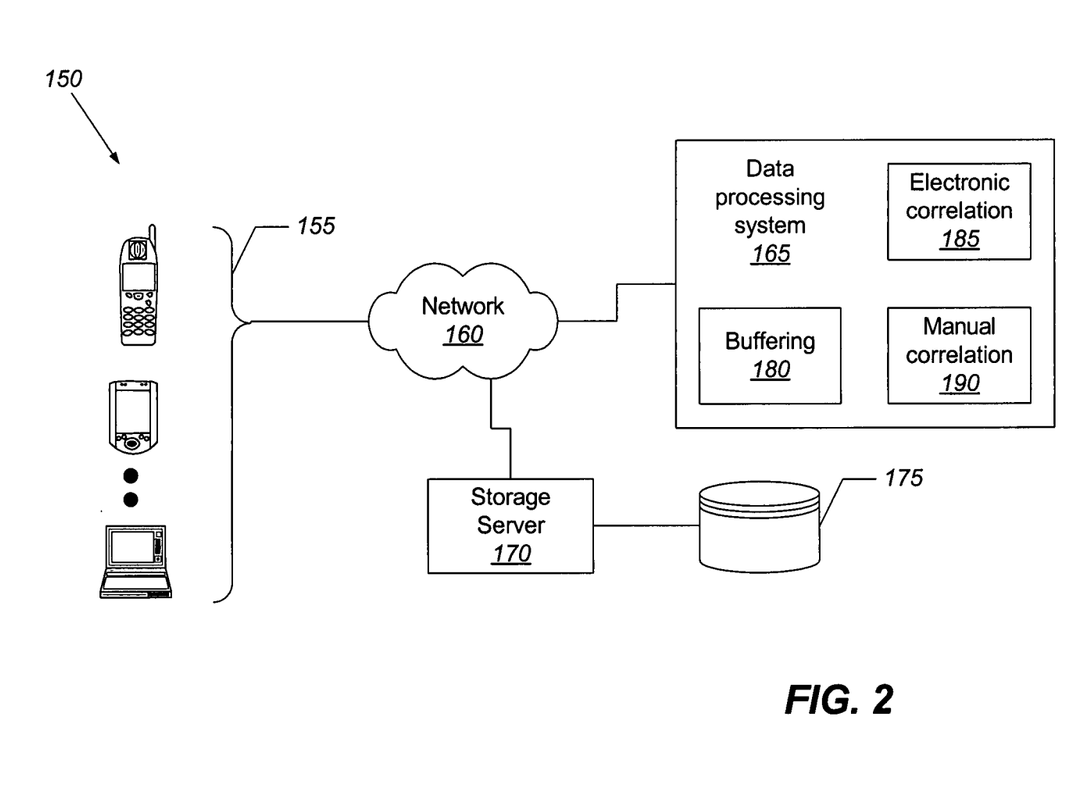
FIG. 2 is a block diagram that illustrates a communication network for managing audio and/or video information in accordance with some embodiments of the present invention.

Referring now to FIG. 2, an exemplary network architecture 150 for managing audio and/or video information, in accordance with some embodiments of the invention, comprises one or more recording devices 155, a network 160, a data processing system 165, and a storage server 170. In accordance with various embodiments of the present invention, the recording device(s) may be a video recorder, an audio recorder, a personal computer with audio and/or video recording equipment, a camera, a cellular phone equipped with audio and/or video recording functionality, etc. As shown in FIG. 2, the recording device(s) may be connected to a data processing system 165 via the network 160 for further processing of the audio and/or video information recorded by the recording device(s) 155. In other embodiments, the recording device(s) 155 may be directly connected to the data processing system 165 or the recording device(s) 155 and data processing system 165 may comprise part of a single system. The network 160 may be a global network, such as the Internet, public switched telephone network (PSTN), or other publicly accessible network. Various elements of the network may be interconnected by a wide area network, a local area network, an Intranet, and/or other private network, which may not accessible by the general public. Thus, the network 160 may represent a combination of public and private networks or a virtual private network (VPN). The storage server 170 may optionally be used to store the processed audio and/or video information in repository 175 for access by one or more users.

The data processing system 165 may be configured to provide various functionality, in accordance with some embodiments of the present invention, including, but not limited to, a buffering function 180, an electronic correlation function 185, and a manual correlation function 190. The audio and/or video information captured by the recording device(s) 155 may be buffered in the recording device(s) 155 and/or may be buffered in the data processing system 165. The recording of the audio and/or video information may be done in a continuous, "always on" manner such that all information recorded is saved via buffering functionality provided by the recording device(s) 155 and/or the data processing system 165. Once recording for an audio and/or video session is complete, the user may elect to save the audio and/or video information from the buffer to a more permanent storage location or may elect to simply discard the audio and/or video information if the user so desires. If the buffered audio and/or video information is saved, then the user may elect to overwrite old audio and/or video information with the newly recorded information or, in other embodiments, may elect to archive the old audio and/or video information and add the newly recorded information to more permanent storage. When saving the newly recorded audio and/or video information, the user may also elect to add a privacy safeguard to the information to prevent others from reviewing the information if the information is stored in a location that may be accessed by others, for example.

The recorded audio and/or video information may be processed so as to add markers thereto that may facilitate searching of the information by the user or others. In this regard, the data processing system 165 may include an electronic correlation function 185 that may be used to electronically process an audio and/or video file and insert markers therein that are correlated with passages or segments of the file. In the case of an audio file, the electronic correlation function 185 may provide an audio-to-text conversion function that generates a text file based on the recorded audio file. The text file may then be processed to generate a concordance of words therein. The words that are deemed relevant may then be correlated with passages in the text file to allow a user to search for keywords and then call up passages of the text that are correlated with those keywords. In some embodiments, text-to-audio processing may be performed to convert the text back into audio allowing the user to listen to the passage(s) retrieved by the keyword search. In the case of a video file, the electronic correlation function 185 may detect logical divisions in the video information and insert markers in the video file identifying these transition points.

Instead of or in addition to an electronic correlation function 185, the data processing system 190 may include a manual correlation function 190 that may provide a user with an interactive technique for annotating an audio and/or video file with markers. One approach for manual correlation is for the user to simply record markers in the audio and/or video information in real time at the time the information is being recorded or for the recording device(s) to automatically insert time-stamps in the recording at periodic intervals. A user may wish, however, to annotate the audio and/or video information after the information has already been recorded. Accordingly, the manual correlation function 190 may provide a user interface for a user to review an audio and/or video file and to insert keywords, sounds, images, or other type of marker to facilitate searching of the audio and/or video file.

In some embodiments, the electronic correlation function 185 and the manual correlation function 190 may be used to generate a single annotated audio and/or video file. In these embodiments, the single file contains both audio and/or video content along with the markers inserted to annotate the file to facilitate searching. In other embodiments, the electronic correlation function and the manual correlation function 190 may be used to generate a separate annotation file that is associated with the audio and/or video file. In these embodiments, the audio and/or video file remains unchanged and the annotation file contains the markers that may be implemented using records. Each record may include an annotation and an associated location in the original audio and/or video file. For example, one annotation could be "dinner conversation with Ben about regatta results," and the location could be in the form HH:MM:SS (relative time from start) or YYYY/MM/DD HH:MM:SS (absolute date and time) for an audio file. Similar date/time location and/or a frame counter could be used for a video file. The separate annotation file may be especially useful, for example, when the audio and/or video file is stored on a read-only medium (e.g., CD or DVD) and/or when it is undesirable to alter the original file.

The buffering function 180, electronic correlation function 185, and manual correlation function 190 will be discussed in greater detail below. Although FIG. 2 illustrates an exemplary communication network, it will be understood that the present invention is not limited to such configurations, but is intended to encompass any configuration capable of carrying out the operations described herein.

Figure 3:
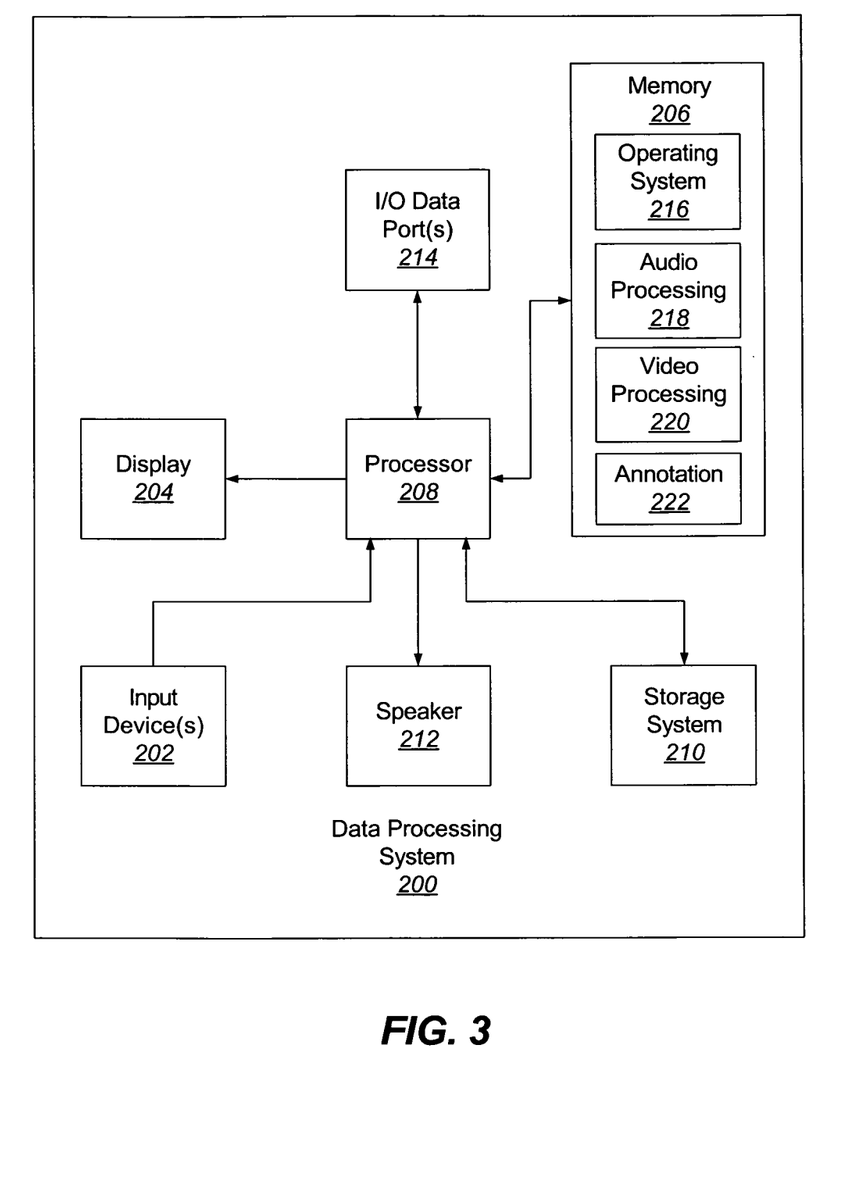
FIG. 3 illustrates a data processing system that may be used to implement a data processing system of the communication network of FIG. 2 in accordance with some embodiments of the present invention.

Referring now to FIG. 3, a data processing system 200 that may be used to implement the data processing system 130 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein.

The processor 208 communicates with the memory 206 via an address/data bus. The processor 208 may be, for example, a commercially available or custom microprocessor. The memory 206 is representative of the one or more memory devices containing the software and data used for managing audio and/or video information in accordance with some embodiments of the present invention. The memory 206 may include, but is not limited to, the following types of devices: cache, ROM, PROM, EPROM, EEPROM, flash, SRAM, and DRAM.

As shown in FIG. 3, the memory 206 may contain up to four or more categories of software and/or data: an operating system 216, an audio processing module 218, a video processing module 220, and an annotation module 222. The operating system 216 generally controls the operation of the data processing system 200. In particular, the operating system 216 may manage the data processing system's software and/or hardware resources and may coordinate execution of programs by the processor 208. The audio processing module 218 may be configured to process a recorded audio file by, for example, using speech recognition technology to convert audio information to text information. The audio processing module 218 may also manage buffered audio files by saving those files that a user desires to maintain and deleting or overwriting those files that a user wishes to discard as discussed above with respect to the buffering function 180 of FIG. 2. Similarly, the video-processing module 220 may be configured to manage buffered video files by saving those files that a user desired to maintain and deleting those files that a user wishes to discard as discussed above with respect to the buffering function 180 of FIG. 2. The annotation module 222 may be configured to process saved audio and/or video files by annotating the audio and/or video information with one or more markers. Such markers may allow a user to categorize or highlight various portions of an audio and/or video file. Advantageously, this may allow a user to search more quickly for desired segments of an audio and/or video file using the one or more markers as search term(s). In accordance with various embodiments of the present invention described in more detail below, the annotation module 222 may provide for automatic, electronic annotation of an audio and/or video file as discussed above with respect to the electronic correlation function 185 of FIG. 2 or may provide for a manual annotation of an audio and/or video file in which one or more markers are obtained from a user through, for example, a user interface as discussed above with respect to the manual correlation function 190 of FIG. 2. In some embodiments, the annotation module 222 need not annotate an audio and/or video file as a user may insert one or more markers, such as a sound, keyword, image, etc., in an audio and/or video file while the file is being recorded.

Although FIG. 3 illustrates exemplary hardware/software architectures that may be used in data processing systems, such as the data processing system 165 of FIG. 2, for managing audio and/or video information, it will be understood that the present invention is not limited to such a configuration but is intended to encompass any configuration capable of carrying out operations described herein. Moreover, the functionality of the data processing system 165 of FIG. 2 and the data processing system 200 of FIG. 3 may be implemented as a single processor system, a multi-processor system, or even a network of stand-alone computer systems, in accordance with various embodiments of the present invention.

Computer program code for carrying out operations of data processing systems discussed above with respect to FIGS. 2 and 3 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
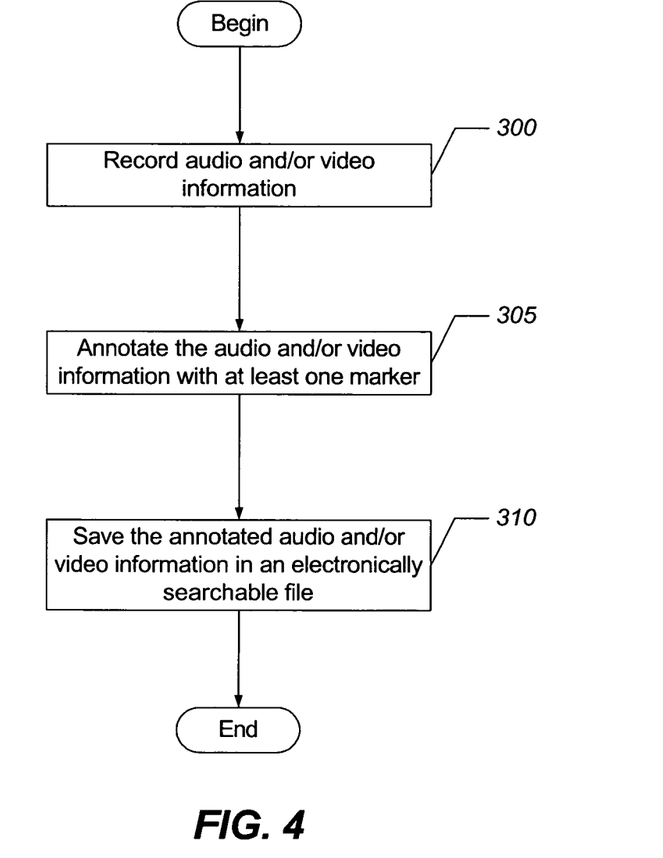
FIGS. 4-8 are flowcharts that illustrate operations of managing audio and/or video information in accordance with some embodiments of the present invention.
Figure 5:
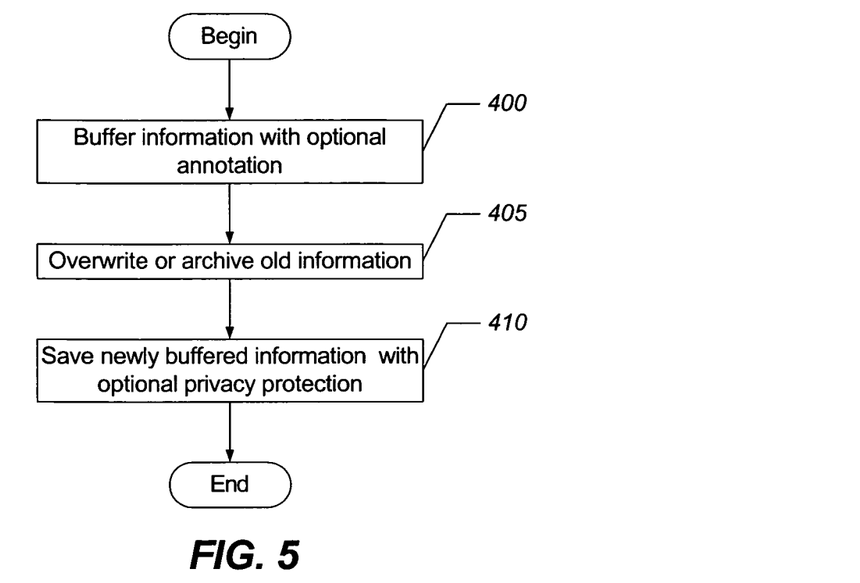

Exemplary operations for managing audio and/or video information will now be described with reference to FIGS. 4 and 2. Operations begin at block 300 where the recording device(s) 155 records audio and/or video information. In accordance with various embodiments of the present invention, the recording device may be always on to record a continuous stream of audio and/or video events or may be turned on and off intermittently based on user input to only record those audio and/or video events that are of interest to the user. Referring now to FIG. 5, the audio and/or video information may be buffered either in the recording device(s) 155 and/or the buffering function 180 of a data processing system at block 400. The buffered audio and/or video information may be transferred to the data processing system 165, 200 where the audio processing module 218 and/or the video-processing module 220 may save or discard the buffered audio and/or video information based on input received from a user. As indicated at block 405, the new buffered audio and/or video information may overwrite old information that has been saved or the old audio and/or video information may be archived and the newly buffered information saved without overwriting any old audio and/or video information. In some embodiments, the newly buffered information may be saved with privacy protection at block 410. This may be useful if the audio and/or video information is stored in a public storage location or in a location that others may have access or gain access to.

Returning to FIG. 4, at block 305, the audio and/or video information is annotated with one or more markers. As discussed above, the marker(s) may serve to categorize and/or highlight segments of the audio and/or video information, which may facilitate searching of the audio and/or video information by one or more users. In some embodiments of the present invention, the audio and/or video information may be annotated while the audio and/or video information is being recorded. For example, a user may record sounds, such as keywords or other demarcation sounds, and/or images while the audio and/or video information is being recorded.

Figure 6:
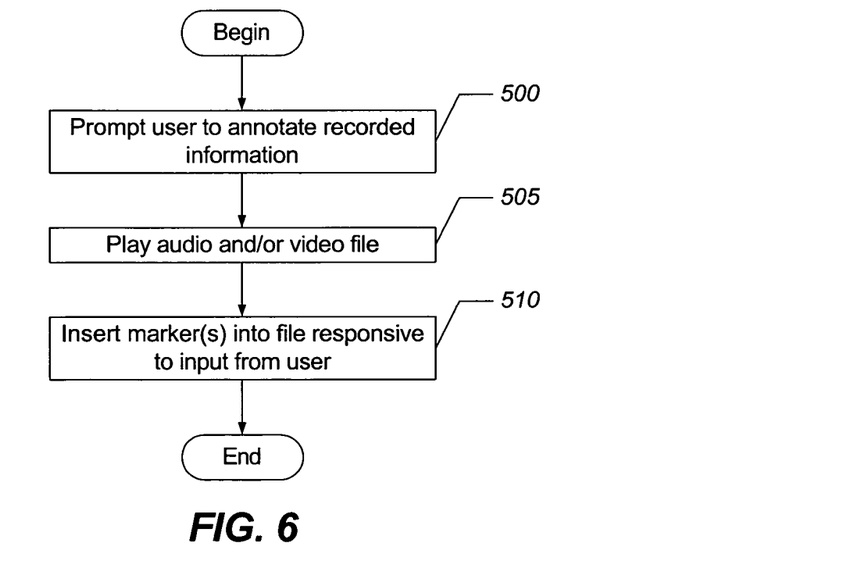

In other embodiments, the audio and/or video information may be annotated after it has been recorded. For example, referring now to FIG. 6, as annotation may be more effective if done within a relatively short time that an audio and/or video recording has been made, the audio processing module 218 and/or the video processing module 220 may prompt a user to annotate recorded audio and/or video information that has been provided by the recording device(s) 155 at block 500. In some embodiments of the present invention, the audio processing module 218 and/or the video processing module 220 may play the recorded audio and/or video information at block 505, respectively, to allow the annotation module 222 to insert one or more markers into the recorded audio and/or video information responsive to input from a user at block 510. The marker(s) may be, for example, an audio marker, such as a sound, keyword, or the like in the case of a recorded audio file and may be an audio, graphic, and/or video marker in the case of a recorded video file.

Figure 7:
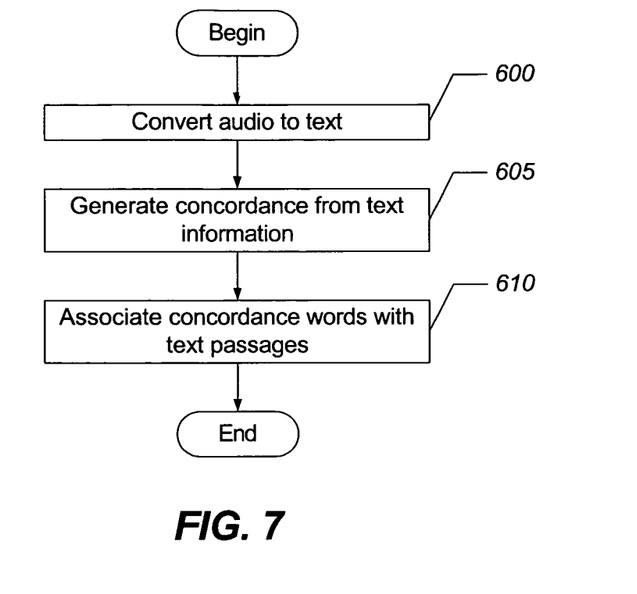

As discussed above, the annotation module 222 may provide for electronic generation of one or more markers to annotate an audio and/or video file without the need for user input. For example, referring now to FIG. 7, the annotation module 222 may use speech recognition technology to process recorded audio information and convert the audio information into text information at block 600. The annotation module 222 may generate a concordance comprising selected words from the text information at block 605 and the text information and concordance may be saved together in an electronically searchable format such that passages of the text information are associated with the words in the concordance at block 610.

Figure 8:
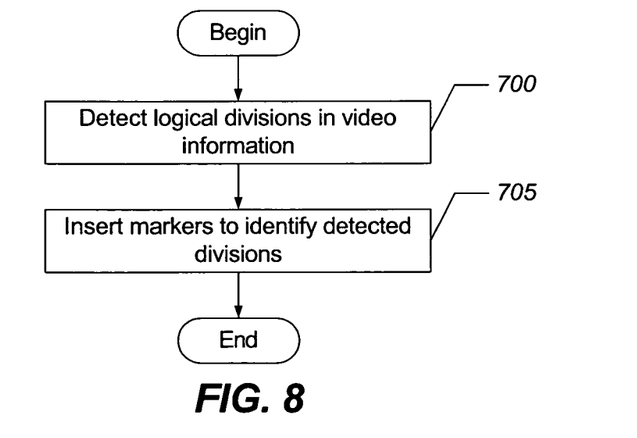

Similarly, referring now to FIG. 8, the annotation module 222 may process video information to detect logical divisions therein, such as, for example, when a scene changes at block 700. The annotation module 222 may generate one or more audio and/or video markers to identify the logical divisions in the video information and the audio and/or video markers may be saved together with the video information in an electronically searchable format at block 705.

Figure 9:
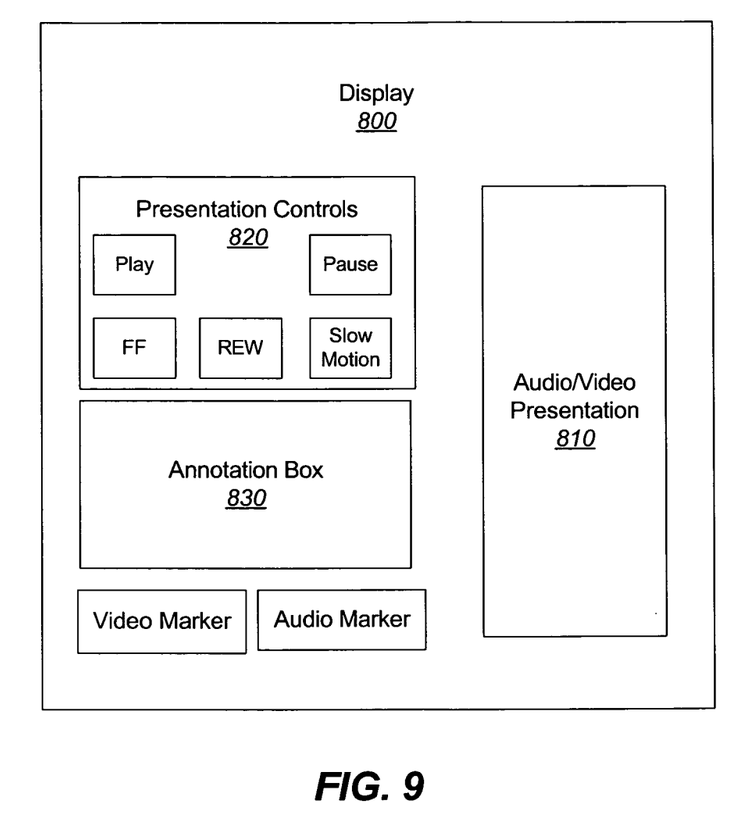
FIG. 9 is a user interface for managing audio and/or video information in accordance with some embodiments of the present invention.

To facilitate annotation of recorded audio and/or video information, the annotation module 222 may provide a user interface as shown in FIG. 9 in which a display 800 includes a window 810 in which the audio and/or video information may be presented to a user. For example, the video information, the text information that has been generated from recorded audio information, or the recorded audio information may be presented in the window 810. A user may manipulate the presentation controls 820 to pause, speed up, slow down, etc. the presentation to allow the user to enter custom markers in the annotation box 830, which are then added to the video, text, and/or audio information. The custom markers may include, but are not limited to, typed text, uploaded images, sounds input through a microphone, and the like. Icons may also be provided, for example, to allow the user to input standard video markers and/or audio markers into the video and/or audio file. This may be useful when a user simply wants to partition an audio and/or video file into segments without the need to distinguish between markers or to add additional information by way of the marker.

In accordance with various embodiments of the present invention, the markers used to annotate the audio and/or video file may be constructed to be of value during a human search and/or during a mechanical search (i.e., automated search). For example, one type of marker that may be used for a video file is a visible icon or image that appears on multiple video frames and is visible during a fast-forward operation. Similarly, for an audio file, an audio marker may be used that is audible and understandable when the audio file is played in a fast-forward manner. To facilitate a mechanical/automated search, embedded markers may be used that are virtually undetectable during a manual review. For example, a marker may be a short burst of high-frequency audio that encodes the annotation and/or a digital annotation embedded in the first few pixels of the first line of a video image. It will be understood that audio and/or video files may include markers of both types that are of value during both human searching and mechanical searching for increased flexibility in accordance with various embodiments of the present invention.

Returning to FIG. 4, the annotated audio and/or video information is saved as an electronically searchable file at block 310. The file may advantageously be searched based on the one or more markers contained therein, such as image, sound, text, date, and/or time stamp markers. Such audio and/or video information may, for example, be used to record various events for an entity, a person, the person's family, or others. In some embodiments, the recording of audio and/or video information may be performed after obtaining the proper authorizations or permissions to record the speech or images of others. In some instances, contributors to the recorded audio and/or video information may be entitled to a copy or some other access to the recorded audio and/or video information. In some embodiments, a user may also wish to assign the annotated audio and/or video file to one or more of the partitions comprising the highway 102 of FIG. 1. The highway 102 may thus serve as a metaphor for the user's life allowing relatively rapid access of information that may be categorized, for example, by subject matter and/or time as illustrated in FIG. 1. Moreover, the annotation functionality provided by some embodiments of the present invention may allow a user to more readily search audio and/or video information that has been recorded and saved as part of the highway 102.

The flowchart of FIGS. 4-8 illustrate the architecture, functionality, and operations of some embodiments of methods, systems, and computer program products for managing audio and/or video information. In this regard, each block represents a module, segment, or portion of code, which comprises one or more executable instructions for implementing the specified logical function(s). It should also be noted that in other implementations, the function(s) noted in the blocks may occur out of the order noted in FIGS. 4-8. For example, two blocks shown in succession may, in fact, be executed That which is claimed:

1. A method, comprising:
recording, by a system including a processor, content comprising a plurality of video frames;
receiving, by the system, user input indicating an icon to be used for annotation;
annotating, by the system, the content to generate annotated content, wherein the annotating includes adding the icon to a group of video frames of the plurality of video frames, wherein a number of frames for the group of video frames is selected that enables the icon to be visible to a user during fast-forward operation of the content; and
saving, by the system, the annotated content in a file that is electronically searchable based on the icon.

2. The method of claim 1, comprising presenting a graphical user interface that includes presentation controls, annotation options and a window for presenting the plurality of video frames, wherein the user input is received by way of the annotation options of the graphical user interface.

3. The method of claim 1, wherein the annotating includes adding an audio marker to the content.

4. The method of claim 1, wherein the annotating comprises:
processing the plurality of video frames to detect logical divisions;
electronically generating a video marker to identify the logical divisions, wherein the content is electronically searchable by the video marker.

5. The method of claim 1, wherein the annotating includes adding a burst of audio to the content.

6. The method of claim 5, wherein the burst of audio has a frequency that is undetectable during a user's review of the content.

7. The method of claim 1, wherein the icon includes time information.

8. The method of claim 1, wherein the annotating includes embedding an annotation into a subset of pixels of a video frame of the group of video frames.

9. The method of claim 8, wherein the subset of pixels is in a first line of pixels of the video frame.

10. The method of claim 1, wherein the icon includes text.

11. The method of claim 1, wherein the annotating includes adding an audio marker to the content that is audible to the user during the fast-forward operation of the content.

12. The method of claim 1, wherein the annotating includes adding an audio marker to the content that is audible to the user during the fast-forward operation of the content, wherein the annotating includes adding a burst of audio to the content that has a frequency that is undetectable during a user's review of the content, and wherein the annotating includes embedding an annotation into a subset of pixels of a video frame of the group of video frames.

13. A system, comprising:
a memory to store executable instructions; and
a processor coupled with the memory, wherein the processor responsive to executing the executable instructions performs operations comprising:
recording content comprising a plurality of video frames;
receiving user input indicating an icon to be used for annotation;
annotating the content to generate annotated content, wherein the annotating includes adding the icon to a group of video frames of the plurality of video frames, wherein a number of frames for the group of video frames is selected that enables the icon to be visible to a user during fast-forward operation of the content; and
saving the annotated content in a file that is electronically searchable based on the icon.

14. The system of claim 13, wherein the annotating is performed while recording the content.

15. The system of claim 13, wherein the operations further comprise detecting logical divisions in the content, and electronically generating the icon to identify the logical divisions.

16. The system of claim 13, wherein the operations further comprise displaying the content via a user interface, and adding an audio marker to the content via the user interface.

17. A non-transitory computer readable storage device comprising executable instructions which, responsive to being executed by a processor, cause the processor to perform operations comprising:
recording video information comprising a plurality of video frames;
receiving user input indicating an icon to be used for annotation;
presenting a graphical user interface that includes presentation controls, annotation options and a window for presenting the video information, wherein the user input is received by way of the annotation options of the graphical user interface;
annotating the video information to include an icon on a group of video frames of the plurality of video frames, wherein a number of frames for the group of video frames is selected to enable the icon to be visible to a user during fast-forward operation of the video information; and
saving the annotated video information including the icon in an electronically searchable file.

18. The non-transitory computer-readable storage device of claim 17, wherein the operations further comprise:
annotating by adding an audio marker to audio content associated with the video information, wherein the audio marker is audible to the user during the fast-forward operation of the video information.

19. The non-transitory computer-readable storage device of claim 17, wherein the operations further comprise:
adding a burst of audio to audio content associated with the video information that has a frequency that is undetectable during a user's review of the audio content; and
embedding an annotation into a subset of pixels of a video frame of the group of video frames.

* * * * *